(12) United States Patent
Bailly

(10) Patent No.: US 7,825,645 B2
(45) Date of Patent: Nov. 2, 2010

(54) SWITCHED-MODE POWER SUPPLY REGULATION

(75) Inventor: Alain Bailly, Rousset (FR)

(73) Assignee: STMicroelectronics SA, Montrouge (FR)

( * ) Notice: Subject to any disclaimer, the term of this patent is extended or adjusted under 35 U.S.C. 154(b) by 817 days.

(21) Appl. No.: 11/703,530

(22) Filed: Feb. 6, 2007

(65) Prior Publication Data

US 2007/0200610 A1    Aug. 30, 2007

Related U.S. Application Data

(63) Continuation-in-part of application No. PCT/FR2005/050646, filed on Aug. 4, 2005.

(30) Foreign Application Priority Data

Aug. 6, 2004    (FR)    ................................ 04 51806

(51) Int. Cl.
*G05F 1/575* (2006.01)
*H02M 3/335* (2006.01)

(52) U.S. Cl. .................... 323/285; 363/56.11; 323/284

(58) Field of Classification Search .................. 363/20, 363/21.01, 21.04, 21.07, 21.09, 21.1, 21.12, 363/21.15, 21.17, 21.18, 97, 131, 56.11; 323/284, 285

See application file for complete search history.

(56) References Cited

U.S. PATENT DOCUMENTS

| | | | | |
|---|---|---|---|---|
| 4,716,510 A | * | 12/1987 | Pace et al. | ..................... 363/49 |
| 5,335,162 A | * | 8/1994 | Martin-Lopez et al. | ....... 363/97 |
| 5,757,214 A | * | 5/1998 | Stoddard et al. | ............. 327/110 |
| 5,892,647 A | * | 4/1999 | Mizoe | .......................... 361/101 |
| 5,943,205 A | * | 8/1999 | Erckert et al. | ............... 361/93.1 |
| 6,100,678 A | * | 8/2000 | Hobrecht | ..................... 323/288 |
| 6,282,110 B1 | | 8/2001 | Chen | |
| 6,429,709 B1 | * | 8/2002 | Hall et al. | .................... 327/175 |
| 6,570,748 B2 | * | 5/2003 | Sanzo | ........................ 361/93.1 |
| 2002/0044463 A1 | * | 4/2002 | Bontempo et al. | ........ 363/21.07 |

FOREIGN PATENT DOCUMENTS

| | | | |
|---|---|---|---|
| EP | WO 9116756 | * | 4/1991 |
| EP | 0576702 B1 | | 1/1994 |
| JP | 2003-299351 | | 10/2003 |

* cited by examiner

*Primary Examiner*—Gary L Laxton
*Assistant Examiner*—Nusrat J Quddus
(74) *Attorney, Agent, or Firm*—Lisa K. Jorgenson; William J. Pigott; Seed IP Law Group PLLC

(57) ABSTRACT

The invention concerns a circuit for detecting an overload in a load supplied by a switched-mode power supply, comprising: a first comparator of a first voltage based on the supply voltage of the load relative to a first threshold, supplying a regulating signal to a pulse generator controlling the switched-mode power supply; a second comparator of a second voltage relative to a second threshold, supplying a signal indicating the presence of an overload; and means for automatically controlling said second voltage by a third threshold lower than the second and higher than the first, and for deactivating the second comparator as long as said automatic control is maintained.

17 Claims, 2 Drawing Sheets

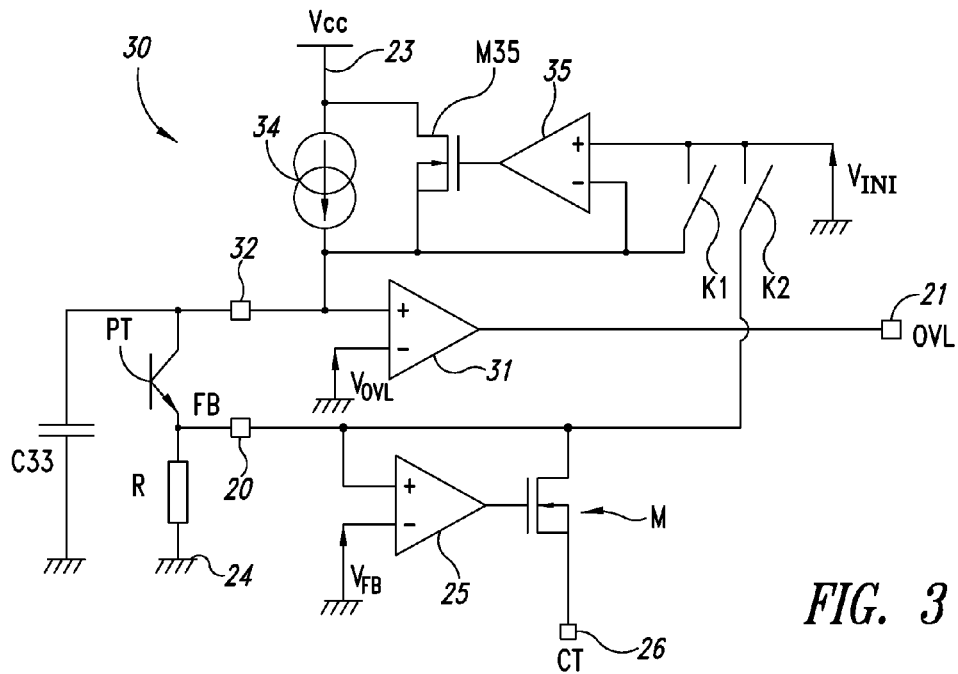
FIG. 3
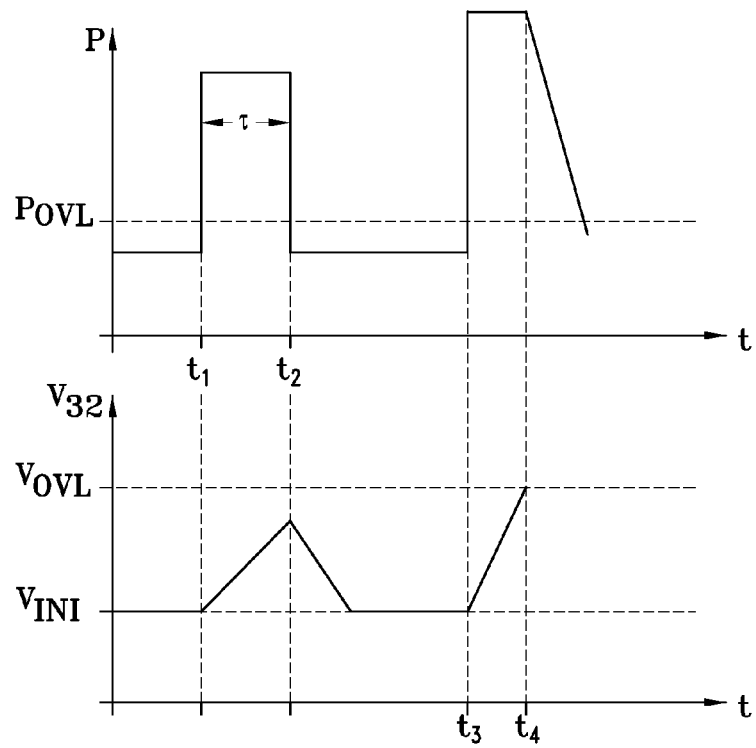
FIG. 4A
FIG. 4B

SWITCHED-MODE POWER SUPPLY REGULATION

TECHNICAL FIELD

The present invention generally relates to the field of switch-mode power supplies and more specifically to the regulation of a switch-mode power supply based on a measurement of the output voltage provided to the secondary of this power supply.

The present invention more specifically applies to a switch-mode power supply having its inductive element belonging to a transformer, to isolate the load supply voltage from the voltage provided to the switch-mode power supply. An optocoupler is then necessary to respect the isolation barrier and the absence of a common ground, also for the regulation.

BACKGROUND

FIG. 1 very schematically and partially shows in the form of blocks an example of a conventional switch-mode power supply of this type. In this example, the power source is an A.C. voltage Vac (for example, the mains voltage originating from the electric distribution network). Voltage Vac is rectified by a diode bridge 1 (for example, fullwave) having its rectified output terminals 2 and 3 connected by a capacitor Cp across which a smoothed D.C. voltage is present. This voltage is applied to the terminals of a primary winding 4p of a transformer 4 by being divided by a switch 5 in series with this winding. Switch 5 is controlled by a pulse train provided by a pulse-width modulation circuit 6 (PWM). It may also be a modulation of the pulse frequency.

On the secondary side (winding 4s) of transformer 4, a diode D in series with a capacitor Cs is connected across winding 4s. Capacitor Cs provides a voltage Vout for supplying a load 7 (Q) between output terminals 8 and 9 of the switch-mode power supply. Information about voltage Vout is further sampled (for example, between terminals 8 and 9) for a measurement circuit 10 (MES) constitutive of a regulation loop of the on periods of switch 5 according to a reference value of the supply voltage of load Q. Circuit 10 controls a photodiode PD of an optocoupler 11 having its phototransistor PT connected to a regulation circuit 12 (REG) intended to provide, to block 6 of generation of the pulse train, at least one first reference signal CT. A second signal OVL of detection of a possible overload, that is, of too high a current surge by load 7, is also provided to circuit 6 by circuit 12.

The example of FIG. 1 is that of a so-called "flyback" converter in which the power is transferred from the primary to the secondary of the circuit during periods where switch 5 is off. The present invention is however not limited to this type of converter and also applies to converters of "forward" type in which the power transfer is performed during on periods of the cut-off switch.

FIG. 2 shows a conventional example of a regulation circuit 12 having its output terminals 26 and 21 providing, to a pulse train generation circuit 6, respectively a regulation signal CT and an overload detection signal OVL. This circuit comprises, in series with phototransistor PT between a terminal 23 of application of a D.C. supply voltage Vcc and ground 24 on the secondary side, a capacitor C12. Circuit 12 being generally made in the form of an integrated circuit, the midpoint of this series association is directly connected to an input terminal 20 of regulation signal FB (that is, of connection of the emitter of phototransistor PT). An analog comparator 25 (differential amplifier) has its non-inverting input connected to terminal 20 and its inverting input which receives a fixed reference voltage $V_{FB}$ conditioning output voltage Vout of the converter. The output of comparator 25 controls a switch M (for example, a MOS transistor) which connects terminal 20 to terminal 26 of provision of a control current (signal CT) to circuit 6 (FIG. 1). A constant current source 27 further connects terminal 20 to ground 24.

The function of comparator 25 is to regulate the voltage of terminal 20 (and thus of the phototransistor emitter) to the value of voltage $V_{FB}$.

When the load needs increase, voltage Vout tends to increase. Circuit 10 (FIG. 1) then controls emitting diode PD, which increases the base current of phototransistor PT. Assuming capacitor 12 to be charged (steady state), the current increase in phototransistor PT increases the voltage of the non-inverting input of comparator 25 since current source 27 cannot carry off more current (constant current). The output voltage of comparator 25 decreases and the current in transistor M increases. The current on terminal 26 forming the current control signal of pulse train generation circuit 6 increases and is interpreted by circuit 6 for, in the example of FIG. 1, decreasing the on periods of switch 5, to build up less power and thus decrease output voltage Vout.

If the load requires more power, voltage Vout tends to decrease. This decrease translates as a decrease in the current in the optocoupler, which tends to decrease the voltage of terminal 20. In fact, capacitor C12 discharges into current source 27, which causes an increase in the output voltage of comparator 25 and a decrease in the conduction of transistor M. The current on terminal 26 decreases and is interpreted by circuit 6 to increase the on periods of switch 5 to build up more power and increase output voltage Vout.

Circuit 12 comprises a second overload detection comparator 28. This comparator has its inverting input connected to terminal 20 and its non-inverting input which receives a voltage $V_{OVL}$ forming an overload threshold. The output of comparator 28 is connected to terminal 21 which provides an overload detection signal OVL to circuit 6.

In the presence of an overload, the greater current surge required at the output causes an abrupt reduction in the current in the optocoupler, which even eventually turns off. With no overload detection, terminal 26 would provide a signal CT requiring from circuit 6 to provide more current still. Now, in case of an overload, it is conversely appropriate to stop the power supply to the secondary.

The function of comparator 28 is to detect when the comparator can no longer maintain terminal 20 at voltage $V_{FB}$ by the regulation. Voltage $V_{OVL}$ is selected to be smaller than voltage $V_{FB}$ and comparator 28 switches when the discharge of capacitor C12 in current source 27 is such that terminal FB reaches threshold $V_{OVL}$. In normal operation, the regulation does not let capacitor C12 discharge sufficiently, which prevents the triggering of comparator 28. Conversely to comparator 25, comparator 28 is generally a comparator with an all-or-nothing output.

In a regulation circuit such as illustrated in FIG. 2, capacitor C12 is used to set the intervention delay of comparator 28 after occurrence of an overload (turning-off of phototransistor PT). This delay is necessary to further enable starting of the circuit on powering-on thereof.

A problem is posed in certain devices (for example, of computer hard disk or printer head type) in which a transient or temporary current surge (for example, at the starting) must not be interpreted as an overload. With a conventional circuit such as illustrated in FIG. 2, a capacitor C12 sufficiently large to detect the detection has to be provided, to avoid starting comparator 28 in transient current surges. A disadvantage then is that the circuit assembly must be oversized to be able to stand transient overloads. Indeed, the power supply will constantly provide all the required power to the secondary, provided that the level remains smaller than the protection threshold corresponding to the regulation loss at the secondary. Now, this level generally corresponds to a level greater than the temporary overloads that the circuit must accept for a proper operation.

BRIEF SUMMARY OF THE INVENTION

The present invention aims at providing a circuit for regulating a switch-mode power supply which overcomes the disadvantages of known circuits.

The present invention especially aims at enabling decrease of the starting threshold of a regulation circuit in case of an overload with respect to a conventional circuit, while letting through transient current peaks used for the starting of the supplied loads.

To achieve these and other objects, the present invention provides a circuit for detecting an overload in a load supplied by a switch-mode power supply, comprising:

a first comparator of a first voltage which is a function of the load supply voltage with respect to a first threshold, providing a regulation signal to a generator of control pulses of the switch-mode power supply;

a second comparator of a second voltage with respect to a second threshold, providing a signal indicative of the presence of an overload; and means for controlling said second voltage with a third threshold smaller than the second one and greater than the first one, and for deactivating the second comparator as long as this control is maintained.

According to an embodiment of the present invention, said means comprise a third comparator of said second voltage with respect to the third threshold, providing a control signal to an element short-circuiting a constant current source of charge of a capacitor connected to ground and across which said second voltage is measured.

According to an embodiment of the present invention, the circuit further comprises means for precharging said capacitor to said third threshold on circuit power-on.

According to an embodiment of the present invention, said second and first voltages are sampled between the terminals of a dipole behaving as a current source, the value of which is a function of the voltage across the load.

According to an embodiment of the present invention, said dipole is a bipolar transistor.

According to an embodiment of the present invention, said transistor is an NPN-type transistor having its emitter connected to ground by an at least resistive passive circuit.

According to an embodiment of the present invention, the value of the passive circuit is selected to deliver a current when the transistor is in the on state which is smaller than the constant current provided by the current source.

According to an embodiment of the present invention, the circuit further comprises means for forcing the first voltage to said third threshold on circuit power-on, said passive circuit being a resistive and capacitive circuit.

According to an embodiment of the present invention, the transistor is a phototransistor of an optocoupler.

According to an embodiment of the present invention, the second comparator controls an element for providing a control current to a pulse generation circuit.

BRIEF DESCRIPTION OF THE DRAWINGS

The foregoing and other objects, features, and advantages of the present invention will be discussed in detail in the following non-limiting description of specific embodiments in connection with the accompanying drawings, in which:

FIG. 3 shows a regulation circuit according to an embodiment of the present invention; and FIGS. 4A and 4B illustrate, in the form of timing diagrams, the operation of the regulation circuit according to the present invention.

DETAILED DESCRIPTION

Figure 2:
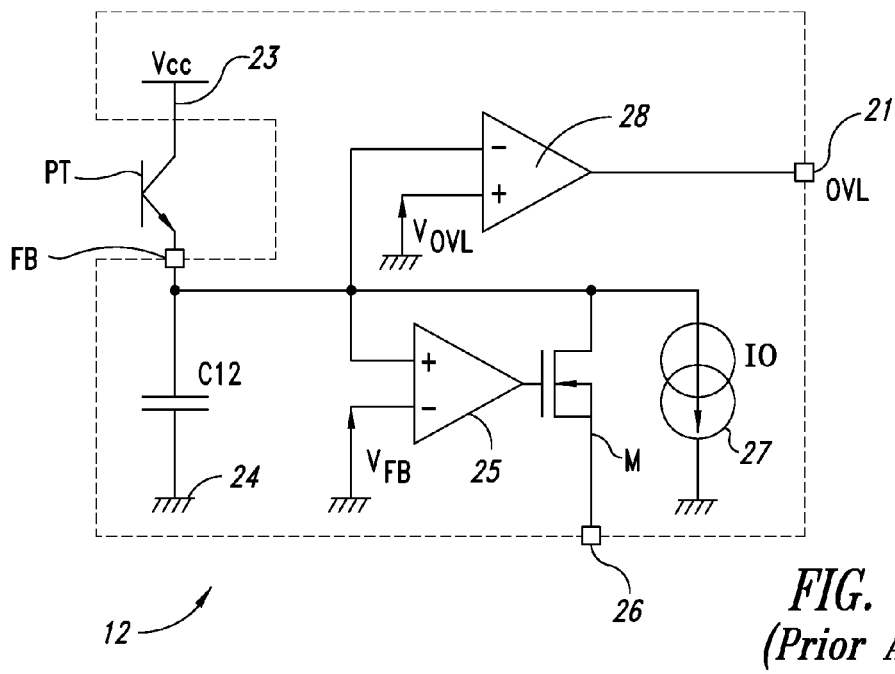
FIG. 2 shows the electric diagram of a known regulation circuit.

In FIG. 3, the same elements have been designated with same references as in FIG. 2 for ease of reference. For clarity, only those elements which are necessary to the understanding of the present invention have been shown in the drawings and will be described hereafter. In particular, the details constitutive of the circuit of generation of the cut-off switch control pulse trains have not been discussed, the present invention being compatible with any conventional pulse train generation circuit, provided for said circuit to exploit a regulation signal (error signal). Similarly, the measurement circuit and other circuits on the secondary side of the switch-mode power supply has not been discussed, the present invention being here again compatible with any conventional circuit of this type.

Figure 1:
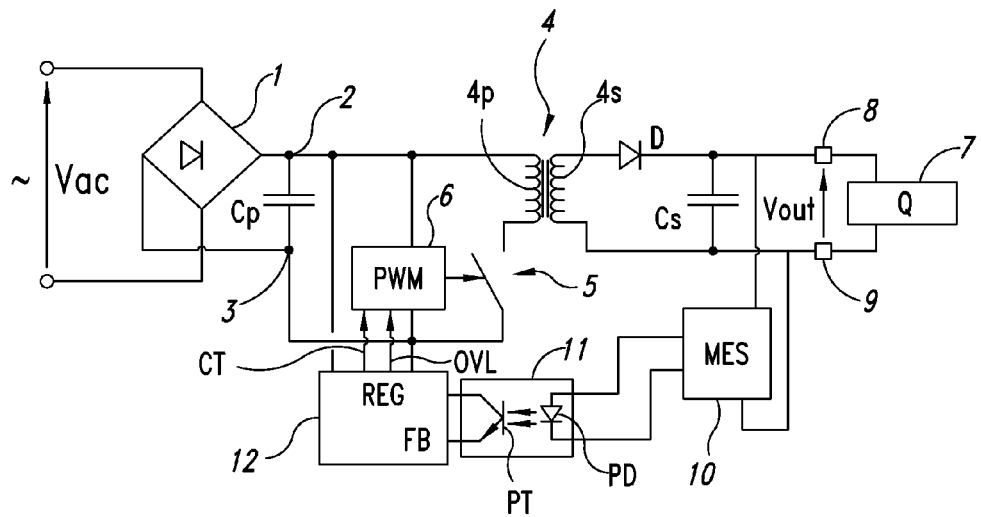
FIG. 1, previously described, shows the diagram of a switch-mode power supply circuit of the type to which the present invention applies.

FIG. 3 shows, in an electric diagram to be compared with that of FIG. 2, a regulation circuit 30 intended to provide an overload detection signal OVL (terminal 21) as well as a control signal CT (terminal 26) to a conventional pulse train generation circuit (circuit 6, FIG. 1).

As previously, a first comparator 25 (in practice, an operational amplifier assembled as a linear comparator) compares the voltage of an input terminal 20 of a signal FB originating from the emitter of a phototransistor PT of an optocoupler (11, FIG. 1) with a reference voltage $V_{FB}$, and controls a MOS transistor M connected between terminals 20 and 26.

According to the present invention, a second comparator 31 receives, on an inverting input, a voltage $V_{OVL}$ setting an overload threshold, and has its output connected to terminal 21. The non-inverting input of comparator 31 is connected to a terminal 32 corresponding to the collector of phototransistor PT of the optocoupler. Terminal 20 is further connected to ground 24 by a resistor R, while terminal 32 is grounded by a capacitor C33. Resistor R may be in series with another capacitor (not shown). Further, internally to circuit 30, a constant current source 34 $I_{BIAS}$ connects a terminal 23 of provision of D.C. supply voltage Vcc to terminal 32 (non-inverting input of comparator 31).

According to the present invention, a third comparator 35 controls a switch M 35 (for example, a MOS transistor) short-circuiting current source 34. Comparator 35 receives, on its non-inverting input, an initialization voltage $V_{INI}$, and has its inverting input connected to terminal 32. The function of comparator 35 is to regulate the voltage of terminal 32, and thus the charge of capacitor C33, to voltage $V_{INI}$. Voltage $V_{INI}$ is selected to be smaller than voltage $V_{OVL}$.

In normal operation, the voltage of point 20 is regulated to voltage $V_{FB}$ by the conduction of transistor M, which thus provides a reference current $I_{FB}$ to the cut-off switch control circuit (not shown in FIG. 3). Current source 35 plays the role of current source 27 (FIG. 2), but in inverted fashion. In other words, instead of discharging the capacitor (C12, FIG. 1), it increases the charge of capacitor C33 when the phototransistor is turned off.

Current $I_C$ in capacitor C33 is equal to $I_{BIAS}-I_R-I_{FB}$, where $I_R$ corresponds to the constant current (equal to $V_{FB}/R$) derived by resistor R through phototransistor PT.

As long as the sum of the two currents $V_{FB}/R$ and $I_{FB}$ is capable of deriving this constant current by sampling it on source 34, comparator 35 succeeds in regulating the voltage of terminal 32 and no overload detection signal OVL is transmitted to the cut-off pulse generation circuit (6, FIG. 1). For this purpose, the current provided by source 34 must be greater than current $V_{FB}/R+I_{FB}$ when transistor PT is on in normal operation.

Resistor R is selected according to the nominal power desired for the load without taking into account possible surge currents. Of course, in the sizing of resistor R, account must be taken of the fact that the current that it conducts must remain smaller than the current provided by source 34. In the opposite case, an operation where temporary overloads are not taken into account is obtained. The circuit of the present invention is accordingly versatile and may adapt to applications with no temporary overload problem. As an alternative, resistive element R is adapted by an external control to allow overloads of longer durations.

In case of a significant current surge by the load, the current decrease in the phototransistor is such that it can no longer provide to resistor R the desired sum of the nominal currents. The excess current is then taken to charge capacitor C33. In particular, if the phototransistor turns off, current $I_{BIAS}$ of source 34 is integrally used to charge capacitor C33.

The delay of intervention of the protection depends on the overload level. The smaller its amplitude, the more the starting delay is lengthened. Capacitor C33 is, for example, selected to approximately adjust the allowed duration of transient current surges (C=IT/ΔU), with I corresponding to the current of source 34 and ΔU corresponding to $V_{OVL}-V_{INI}$.

Thus, for a transient overload, comparator 31 has no time to switch to change the state of signal OVL. The disappearing of the overload turns phototransistor PT back on and the normal operation reappears, the charge of capacitor C33 is brought back to level $V_{INI}$.

However, if the overload is sufficiently large for the voltage across the capacitor to reach threshold voltage $V_{OVL}$, comparator 31 switches.

To ensure the starting of circuit 30, a switch K1 connects the non-inverting input of comparator 35 to terminal 32. Switch K1 is on upon starting of the circuit and is used to precharge capacitor C33 to voltage $V_{INI}$. Without this precharge, the collector voltage of transistor PT would remain smaller than its emitter voltage and said transistor could not be turned on. Voltage $V_{INI}$ is selected to be greater than voltage $V_{FB}$ for phototransistor PT to be properly biased.

According to a preferred embodiment, a second (optional) switch K2 connects the non-inverting input of comparator 35 to terminal 20. This switch is turned on at the same time as switch K1 and enables a soft start of the circuit if, simultaneously, a network RC is externally connected to terminal 20. In this case, when the preload is ended, this network RC discharges into terminal 20, which limits the output power. This in fact generates a starting ramp. According to an alternative embodiment, resistor R is a variable resistor, which enables adjusting the level of the operation threshold.

According to another alternative, an additional current source injects a current directly into resistor R, which enables lowering current peak thresholds.

FIGS. 4A and 4B illustrate, in the form of timing diagrams, the operation of the regulator of FIG. 3. FIG. 4A illustrates an example of the shape of power P provided to the load, while FIG. 4B illustrates the variation of voltage V32 on terminal 32. Thresholds $V_{INI}$ and $V_{OVL}$ have been indicated in FIG. 4B, while a threshold $P_{OVL}$ has been indicated in FIG. 4A. Threshold $P_{OVL}$ (which depends on the value of capacitance C33) corresponds to the power from which it is considered that an overload has been detected.

Initially, the power level absorbed by the load is under level $P_{OVL}$, voltage V32 then remains at level $V_{INI}$. It is assumed that at a time t1, a temporary overload appears (for example, linked to the beginning of the driving of a computer hard disk). In this case, power P abruptly increases and remains at a high level for a time τ (duration of the transient current peak). From time t1, voltage V32 linearly increases but does not reach threshold $V_{OVL}$ at time t2 where the overload disappears. Accordingly, no overload detection is transmitted to the cut-off switch control circuit. From time t2, if the normal operation is recovered, voltage V32 progressively reaches value $V_{INI}$.

Assume that at a time t3, another overload appears but, this time, with a greater intensity and durably. Since the overload intensity is greater, the power in the load is also greater. Accordingly, the charge of capacitor C33 from time t3 is faster than from time t1. This results from the fact that capacitor C33 is charged with a variable current ($I_{BIAS}-I_R-I_{FB}$). According to the value of current $I_{FB}$, capacitor C33 receives a greater or smaller current. As soon as voltage V32 reaches thresholds $V_{OVL}$, a signal indicative of an overload is transmitted to the cut-off switch control circuit so that it turns off switch 5 permanently as long as the overload remains. From time t4 when the overload detection has been transmitted to circuit 6, it can be considered that the turning-off (in practice, delayed) of cut-off switch 5 makes this overload disappear and power P decreases. In practice, the overload state is memorized by the fact that the regulation loop requires more power still, since the converter has stopped. This generally causes a general reset of the switch-mode power supply and its restarting (so-called hiccup mode).

What interpretation is made of overload signal OVL is compatible with current uses of overload detection signals.

An advantage of the present invention is that it avoids the conventional oversizing of the components of a switch-mode power supply to accept transient overloads, especially in operation. These components are here sized according to the admissible power during such transient overloads. They however do not have to permanently stand greater overintensities.

Another advantage of the present invention is that it maintains the regulation even during start current surges. Indeed, when the overload detection (signal OVL) is not triggered, circuit 6 receives a greater power demand during these peaks, which is desirable.

In an embodiment in integrated form, the present invention requires an additional terminal (32) to enable connection of the collector of transistor PT of the optocoupler.

Of course, the present invention is likely to have various alterations, modifications, and improvements which will readily occur to those skilled in the art. In particular, the practical forming of the regulation circuit of the present invention and, especially the sizing of the different components, is within the ability of those skilled in the art according to the application, based on the functional indications given hereabove. Further, although the present invention has been described in relation with a preferred example of application to a switch-mode power supply using an optocoupler to convey the regulation signal and an isolation transformer, it more generally applies, as soon as the regulation signal is likely to be interpreted by the regulation circuit, in the same way for an overload as for a normal additional current need and as the load is likely to have transient surges which are not overloads. For example, the same problem is posed if the optocoupler is a bipolar transistor having its base controlled by a voltage-to-current converter based on a measurement of voltage Vout. Further, bipolar transistor PT may be formed of any dipole behaving as a current source having its value used to drive the power component.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A circuit for detecting an overload in a load supplied by a switch-mode power supply, comprising:
    a first comparator of a first voltage with respect to a first threshold, the first voltage being a function of a load supply voltage, the first comparator providing a regulation signal to a generator of control pulses of the switch-mode power supply;
    a second comparator of a second voltage with respect to a second threshold, the second comparator providing a signal at its output indicative of the presence of an overload, the second voltage being different from the first voltage after starting of the circuit is completed; and
    a subcircuit that controls the value of said second voltage, the subcircuit receiving a third threshold smaller than the second threshold and greater than the first threshold, the output of the second comparator being low as long as the second voltage is less than or equal to the third threshold.

2. The circuit of claim 1 wherein said subcircuit comprises a third comparator of said second voltage with respect to the third threshold, the third comparator configured to provide a control signal to an element operable to short-circuit a constant current source of charge, the circuit of claim 1 further comprising a capacitor connected to ground, across which said second voltage is measured.

3. The circuit of claim 2, further comprising a means for precharging said capacitor to said third threshold on a power-on of the circuit.

4. The circuit of claim 1 wherein said second and first voltages are sampled between the terminals of a dipole behaving as a current source, the value of which is a function of the voltage across the load.

5. The circuit of claim 4 wherein said dipole is a bipolar transistor.

6. The circuit of claim 5 wherein said transistor is an NPN-type transistor having its emitter connected to ground by an at least resistive passive circuit.

7. The circuit of claim 6 wherein the value of the passive circuit is selected to deliver a current when the transistor is in the on state, which is smaller than the constant current provided by the current source.

8. The circuit of claim 6, further comprising a means for forcing the first voltage to said third threshold on a power-on of the circuit, said at least resistive passive circuit being a resistive and capacitive circuit.

9. The circuit of claim 6 wherein the transistor is a phototransistor of an optocoupler.

10. The circuit of claim 1 wherein the second comparator controls an element for providing a control current to a pulse generation circuit.

11. A circuit for detecting an overload in a load comprising:
    a first logic circuit that receives a first voltage at a first input which represents a load supply voltage, receives a first threshold voltage at a second input, and outputs a regulation signal based on the inputs;
    a comparator that receives a second voltage at a first input and receives a second threshold voltage at a second input, the comparator providing a signal at its output indicative of the presence of an overload, the first and second voltages being different from each other after starting of the circuit is completed; and
    a second logic circuit that varies the value of said second voltage by switchably bypassing a constant current source, the second logic circuit being switchable to receive at a first input either the first voltage or the second voltage in addition to a third threshold voltage, the second logic circuit being configured to receive said second voltage at a second input and output a control signal based on the inputs, the output control signal coupled to vary the value of the second voltage.

12. The circuit of claim 11 wherein said second logic circuit comprises a third comparator of said second voltage with respect to the third threshold voltage and provides the control signal to an element operable to short-circuit the constant current source, the constant current source configured to charge a capacitor connected between the second voltage and ground and across which capacitor said second voltage is measured.

13. The circuit of claim 11 wherein the first logic circuit is a comparator.

14. The circuit of claim 11 wherein the first logic circuit includes an operational amplifier.

15. The circuit of claim 1 wherein the first comparator is an operational amplifier configured as a linear comparator.

16. The circuit of claim 1 wherein the second comparator is an operational amplifier configured as a linear comparator.

17. The circuit of claim 1 wherein the subcircuit includes a third comparator that is an operational amplifier configured as a linear comparator.

* * * * *